US012687167B2

(12) United States Patent
Lee et al.

(10) Patent No.: US 12,687,167 B2
(45) Date of Patent: Jul. 21, 2026

(54) ELECTRIC COMPRESSOR

(71) Applicant: Hanon Systems, Daejeon (KR)

(72) Inventors: Hyun Woo Lee, Daejeon (KR); Seung Yong Hwang, Daejeon (KR); Sung Taeg Oh, Daejeon (KR); Min Gyu Kim, Daejeon (KR); Seung Kil Kim, Daejeon (KR); Sang Woo Bae, Daejeon (KR); Hew Nam Ahn, Daejeon (KR); Young Seop Yoon, Daejeon (KR); Je Su Yun, Daejeon (KR)

(73) Assignee: HANON SYSTEMS, Daejeon (KR)

(*) Notice: Subject to any disclaimer, the term of this patent is extended or adjusted under 35 U.S.C. 154(b) by 0 days.

(21) Appl. No.: 18/563,194

(22) PCT Filed: Apr. 13, 2023

(86) PCT No.: PCT/KR2023/004992

§ 371 (c)(1),
(2) Date: Nov. 21, 2023

(87) PCT Pub. No.: WO2024/080465

PCT Pub. Date: Apr. 18, 2024

(65) Prior Publication Data

US 2025/0237216 A1 Jul. 24, 2025

(30) Foreign Application Priority Data

Oct. 14, 2022 (KR) ........................ 10-2022-0132353

(51) Int. Cl.

| | |
|---|---|
| ***F04C 23/02*** | (2006.01) |
| ***H01R 13/03*** | (2006.01) |
| ***H01R 13/04*** | (2006.01) |

(52) U.S. Cl.

CPC ............. *F04C 23/02* (2013.01); *H01R 13/03* (2013.01); *H01R 13/04* (2013.01); *F04C 2240/403* (2013.01); *F04C 2240/803* (2013.01)

(58) Field of Classification Search

CPC ......... H01R 13/03; H01R 13/04; F04C 23/02; F04C 2240/403; F04C 2240/803

(Continued)

(56) References Cited

U.S. PATENT DOCUMENTS 6,582,251 B1 * 6/2003 Burke ................ H01R 13/5202 439/589
7,081,012 B2 * 7/2006 Gensert .................. B60K 15/03 439/935

(Continued)

FOREIGN PATENT DOCUMENTS

JP 2012186969 A 9/2012
JP 2021170428 A 10/2021

(Continued)

*Primary Examiner* — Gary F Paumen

(74) *Attorney, Agent, or Firm* — Shumaker, Loop & Kendrick, LLP; James D. Miller

(57) ABSTRACT

An electric compressor includes a motor configured to generate power; a compression mechanism configured to be driven by the motor and to compress a refrigerant; an inverter configured to control the motor; and a connector configured to include a terminal pin connecting the motor and the inverter, a plate supporting the terminal pin, and an insulator that insulates between the terminal pin and the plate, wherein at least a portion of the insulator is formed to be surrounded by the terminal pin, so that it is possible to suppress the increase in cost, weight, and size due to the connector.

14 Claims, 6 Drawing Sheets

(58) Field of Classification Search
USPC .......................................... 439/884, 935, 936
See application file for complete search history.

(56) References Cited

U.S. PATENT DOCUMENTS

| | | | | |
|---|---|---|---|---|
| 7,442,081 | B2 * | 10/2008 | Burke | B29C 45/14639 439/589 |
| 8,614,819 | B2 * | 12/2013 | Akimoto | H04N 1/2191 358/1.18 |
| 10,454,334 | B2 * | 10/2019 | Heo | H02K 5/225 |
| 11,128,193 | B2 * | 9/2021 | Heo | F04C 27/00 |
| 2012/0228023 | A1 * | 9/2012 | Fukasaku | F04C 18/0215 174/668 |
| 2019/0052144 | A1 * | 2/2019 | Heo | H02K 5/225 |
| 2020/0355405 | A1 * | 11/2020 | Yim | F01C 21/10 |
| 2020/0395807 | A1 * | 12/2020 | Heo | H02K 5/22 |

FOREIGN PATENT DOCUMENTS

| | | | |
|---|---|---|---|
| KR | 20180028304 | A | 3/2018 |
| KR | 20190094611 | A | 8/2019 |
| KR | 20200129693 | A | 11/2020 |

* cited by examiner

【FIG. 1】
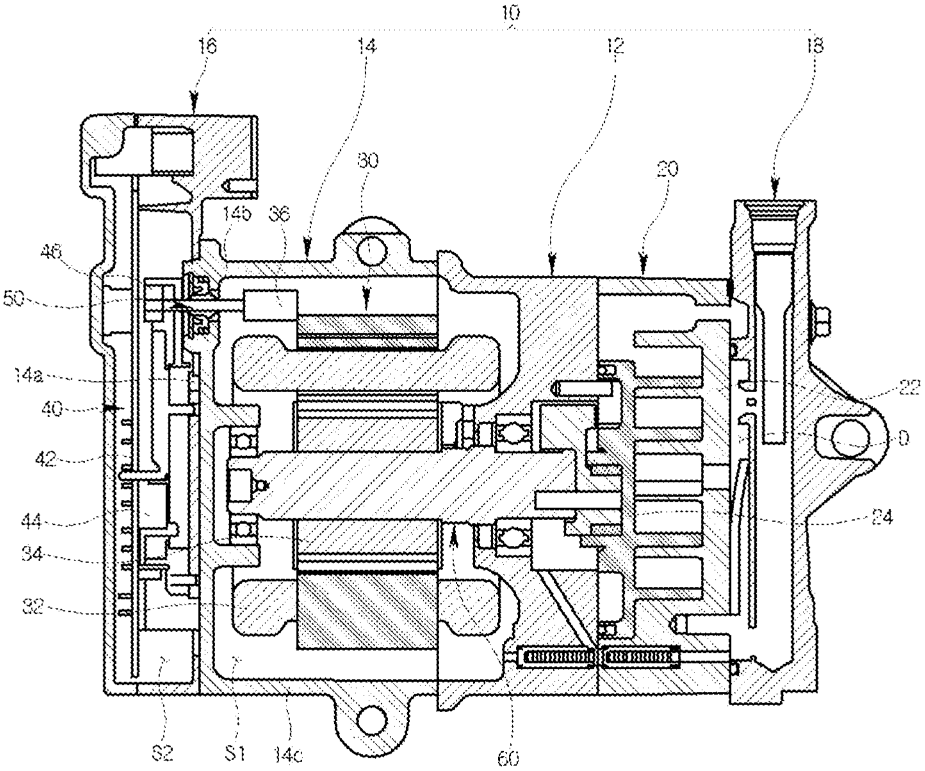

【FIG. 2】
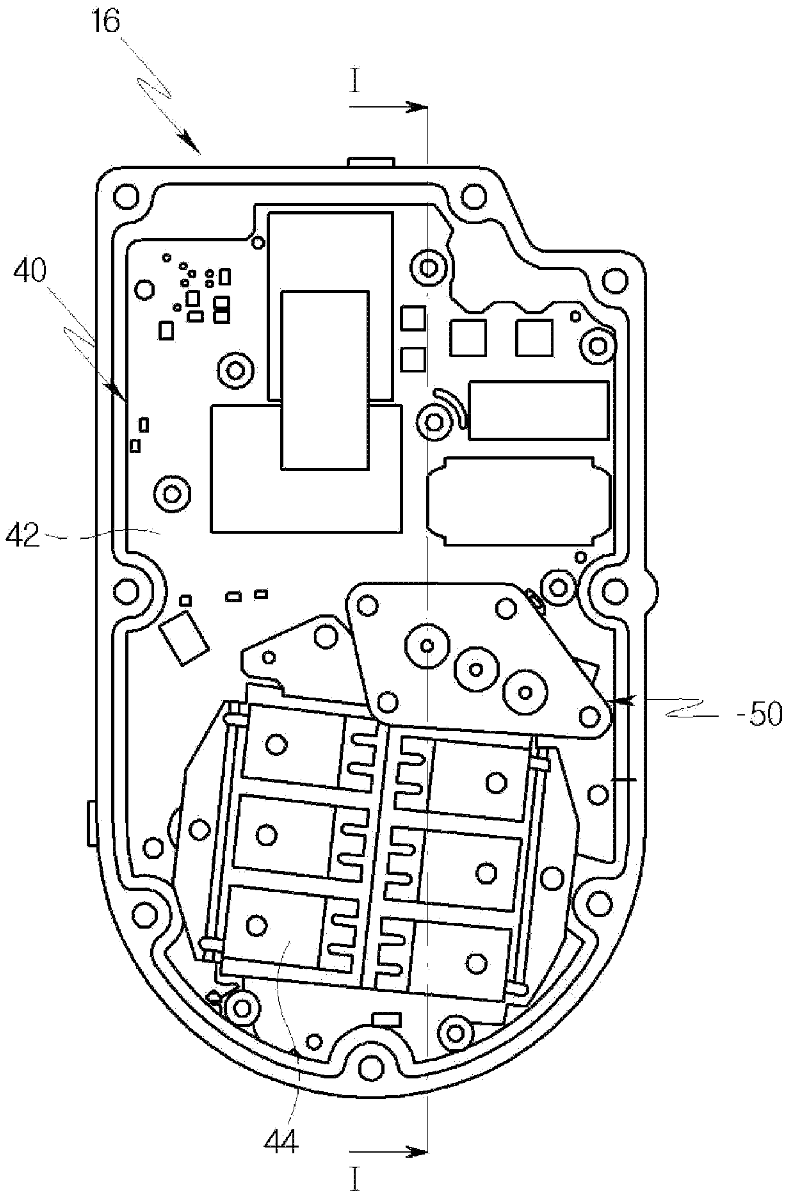

【FIG. 3】
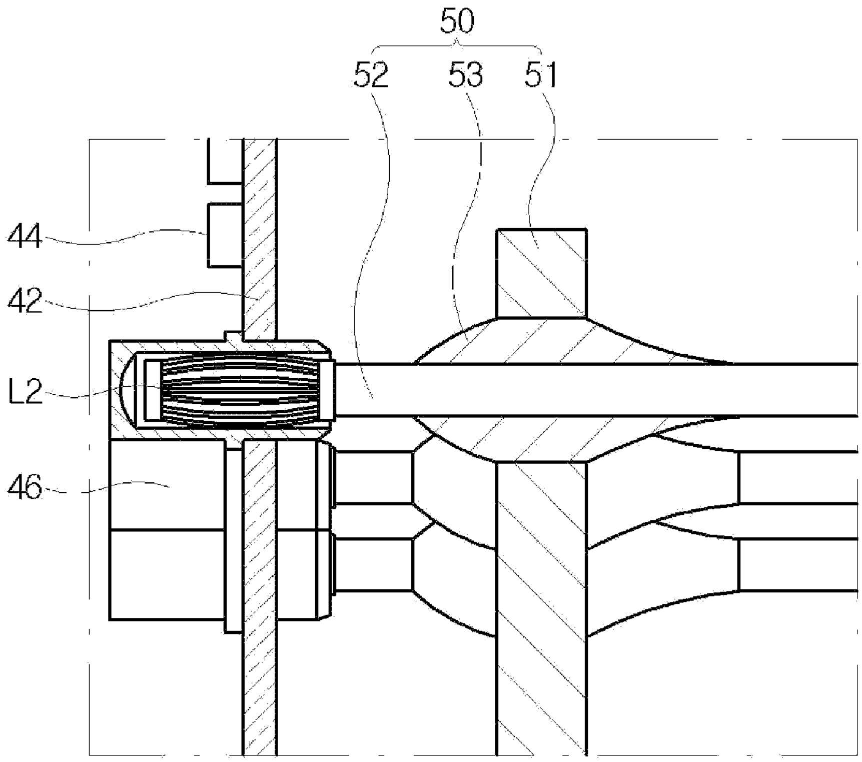

【FIG. 4】
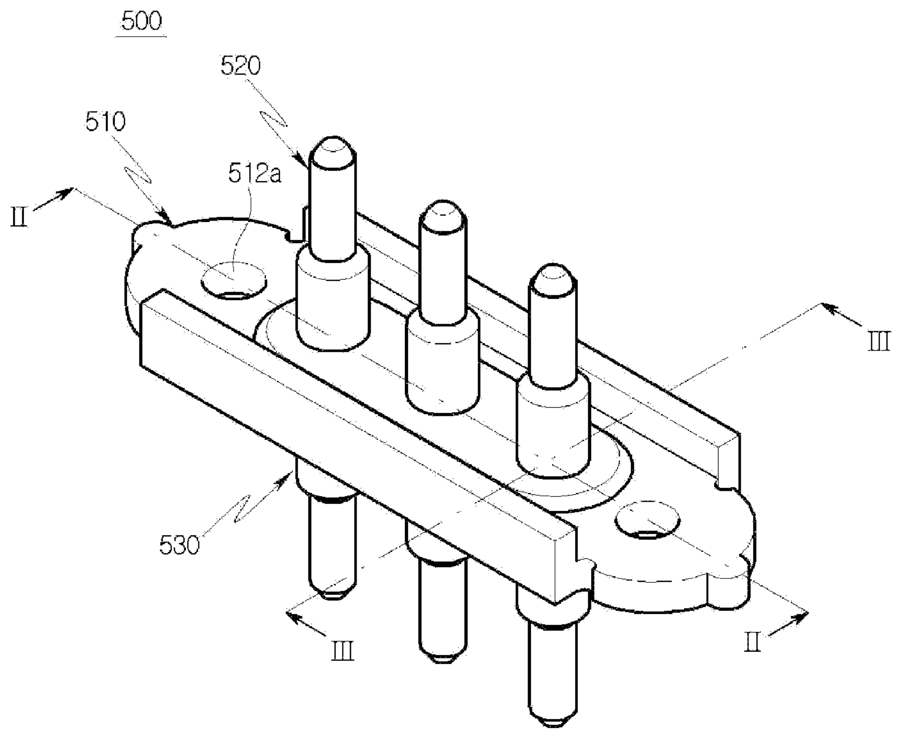

【FIG. 5】
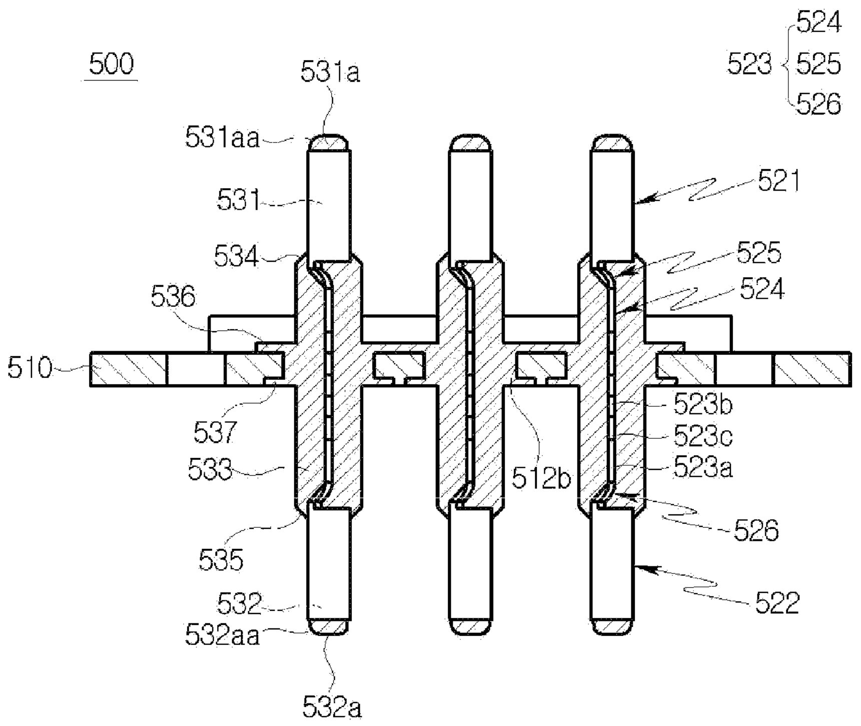

【FIG. 6】
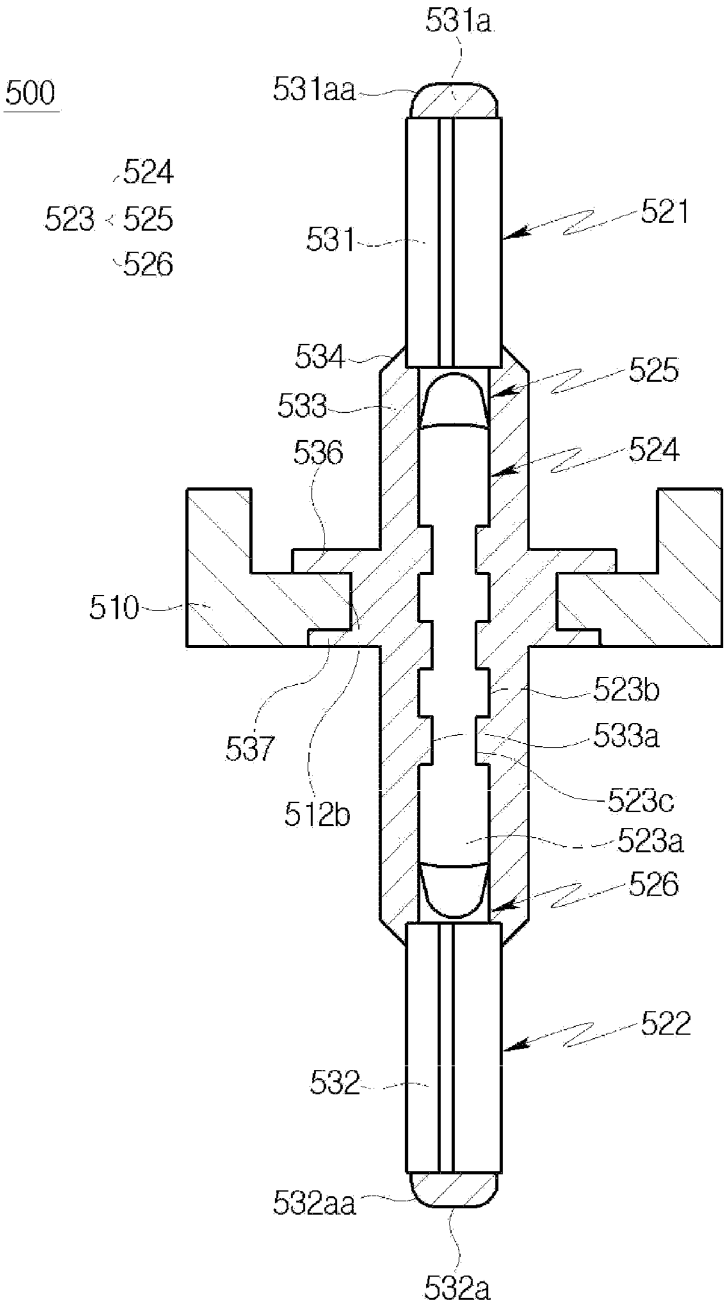

ELECTRIC COMPRESSOR

CROSS REFERENCE TO RELATED PATENT APPLICATIONS

This is a U.S. national phase patent application of PCT/KR2023/004992 filed Apr. 13, 2023 which claims the benefit of and priority to Korean Patent Application No. 10-2022-0132353, filed on Oct. 14, 2022, the entire contents of each of which are incorporated herein by reference.

TECHNICAL FIELD

The present disclosure relates to an electric compressor and more particularly to an electric compressor capable of compressing a refrigerant by a driving force of a motor that is controlled by an inverter.

BACKGROUND ART

In general, a compressor is a device for compressing a fluid such as a refrigerant gas, etc., and is applied to an air-conditioning system of a building, an air-conditioning system for a vehicle, etc.

The compressor may be divided, according to a compression type, into a reciprocating type compressor that compresses the refrigerant through a reciprocating motion of a piston and a rotary type compressor that compresses the refrigerant while rotating. The reciprocating type compressor may be divided into a crank type compressor that transmits power to a plurality of pistons by using a crank according to a power transmission method, a swash plate type compressor that transmits power to a rotating shaft on which the swash plate is installed, etc. The rotary type compressor may be divided into a vane rotary type compressor using a rotating shaft and a vane and a scroll type compressor using an orbiting scroll and a fixed scroll.

Also, the compressor may be divided according to a driving method into a mechanical compressor that uses an engine and an electric compressor that uses a motor.

Here, an inverter that controls the motor so as to control the compression capacity is applied to the electric compressor.

FIG. 1 is a cross sectional view showing a conventional electric compressor. FIG. 2 is a front view showing a connector and an inverter in the electric compressor of FIG. 1. FIG. 3 is a cross sectional view taken along line I-I.

Referring to FIGS. 1 to 3, a conventional electric compressor includes a motor 30 that generates power, a compression mechanism 20 that receives the power from the motor 30 and compresses a refrigerant, an inverter 40 that controls the motor 30, and a connector 50 that electrically connects the motor 30 and the inverter 40.

Here, a housing 10 receiving the motor 30 and the inverter 40 includes a partition wall 14*a* that divides a motor receiving space S1 that receives the motor 30 and an inverter receiving space S2 that receives the inverter 40. The connector 50 seals the motor receiving space S1 and the inverter receiving space S2, passes through the partition wall 14*a*, and is connected to a motor terminal 36 and an inverter terminal 46, so that the motor 30 and the inverter 40 are electrically connected. That is, the connector 50 includes a plate 51 that blocks a through hole 14*b* of the partition wall 14*a* and a terminal pin 52 that passes through the plate 51. One end of the terminal pin 52 is connected to the motor terminal 36, and the other end of the terminal pin 52 is connected to the inverter terminal 46.

Here, in order to prevent poor contact that occurs when an inner diameter of the motor terminal 36 is larger than an outer diameter of one end of the terminal pin 52, a first lamella spring (not shown) which has an inner circumferential surface in contact with an outer circumferential surface of the one end of the terminal pin 52 and an outer circumferential surface in contact with an inner circumferential surface of the motor terminal 36 is interposed between the one end of the terminal pin 52 and the motor terminal 36.

Also, in order to prevent poor contact that occurs when an inner diameter of the inverter terminal 46 is larger than an outer diameter of the other end of the terminal pin 52, a second lamella spring L2 which has an inner circumferential surface in contact with an outer circumferential surface of the other end of the terminal pin 52 and an outer circumferential surface in contact with an inner circumferential surface of the inverter terminal 46 is interposed between the other end of the terminal pin 52 and the inverter terminal 46.

Meanwhile, since both the plate 51 and the terminal pin 52 are made of a conductive material, insulation is required between the plate 51 and the terminal pin 52. In consideration of this, the connector 50 further includes an insulator 53 made of glass that insulates between the plate 51 and the terminal pin 52.

However, in such a conventional electric compressor, there is a problem that cost, weight, and size are increased by the connector 50 that connects the motor 30 and the inverter 40. Specifically, as the insulator 53 is made of a glass material, the insulator 53 has a large specific gravity and is difficult to process, resulting in the increase in weight and cost. In addition, when the terminal pin 52 is made of a material having a high electrical conductivity, the terminal pin 52 has a large thermal expansion, and thus, the glass-made insulator 53 is damaged. Therefore, in order to prevent this problem, the terminal pin 52 is made of a material having a low electrical conductivity (for example, SUS). Accordingly, the outer diameter of the terminal pin 52 must be increased so as to meet a predetermined allowable current. Such increase in the outer diameter of the terminal pin 52 directly results in the increase in size and cost of the connector 50 because an insulation distance must be obtained.

SUMMARY

Accordingly, the purpose of the present disclosure is to provide an electric compressor capable of suppressing the increase in cost, weight, and size due to a connector that connects a motor and an inverter.

One embodiment is an electric compressor including: a motor configured to generate power; a compression mechanism configured to be driven by the motor and to compress a refrigerant; an inverter configured to control the motor; and a connector configured to include a terminal pin connecting the motor and the inverter, a plate supporting the terminal pin, and an insulator that insulates between the terminal pin and the plate. At least a portion of the insulator is formed to be surrounded by the terminal pin.

The terminal pin may include portions having different cross-sectional areas in a direction perpendicular to an extension direction.

The insulator may include: a first end protruding toward the motor, a second end protruding toward the inverter, and a middle portion extending from the first end to the second end and passing through the plate. The terminal pin may include: a first terminal that surrounds an outer peripheral surface of the first end, a second terminal that surrounds an outer peripheral surface of the second end, and a connection portion that extends from the first terminal to the second terminal and is received in the middle portion.

The connection portion may include a groove that is engraved on an outer peripheral surface of the connection portion, the insulator may include a protrusion that is inserted into the groove.

The first end and the second end may be each formed in a cylindrical shape, the first terminal and the second terminal may be each formed in an annular shape.

The first terminal is inserted into a first lamella spring and an outer peripheral surface of the first terminal comes into contact with an inner peripheral surface of the first lamella spring, and the first lamella spring is inserted into a terminal of the motor and an outer peripheral surface of the first lamella spring comes into contact with the terminal of the motor, so that the terminal pin can be electrically connected to the motor. The second terminal is inserted into a second lamella spring and an outer peripheral surface of the second terminal comes into contact with an inner peripheral surface of the second lamella spring, and the second lamella spring is inserted into a terminal of the inverter and an outer peripheral surface of the second lamella spring comes into contact with the terminal of the inverter, so that the terminal pin can be electrically connected to the inverter.

The first end may include a first front end protruding further toward the motor than the first terminal. The second end may include a second front end protruding further toward the inverter than the second terminal.

An edge of the first front end and an edge of the second front end may be chamfered.

The middle portion is formed in a cylindrical shape that is concentric with the first end and the second end and that has an outer diameter larger than those of the first end and the second end, so that a first stepped portion may be formed between the first end and the middle portion and a second stepped portion may be formed between the second end and the middle portion.

A cross-section perpendicular to an extension direction of the connection portion may include a pair of long sides parallel to each other and a pair of short sides parallel to each other. A length of the long side may be formed less than an outer diameter of the first terminal and an outer diameter of the second terminal, and a length of the short side may be formed less than the length of the long side.

The connection portion may include a pair of long side surfaces each including the pair of long sides and a pair of short side surfaces each including the pair of short sides. A plurality of the terminal pins may be provided. The plurality of terminal pins may be arranged to be spaced apart from each other in an extension direction of the plate, and the long side surfaces of the plurality of terminal pins may be arranged to face each other.

The connection portion may include a central portion disposed concentrically with the first terminal and the second terminal, a first curved portion extending from the central portion to the first terminal, and a second curved portion extending from the central portion to the second terminal.

The first terminal and the second terminal may be each formed to be spaced apart from the plate within a range of 3 mm to 20 mm.

The insulator may further include a first flange and a second flange. The first flange extends radially outward from the middle portion and covers a portion of a motor-facing surface of the plate, and the second flange extends radially outward from the middle portion and covers a portion of an inverter-facing surface of the plate.

The insulator may be made of a plastic material, and the terminal pin may be made of a copper material.

The electric compressor according to the embodiment of the present disclosure includes: a motor that generates power; a compression mechanism that is driven by the motor and compresses a refrigerant; an inverter that controls the motor; and a connector that includes a terminal pin connecting the motor and the inverter, a plate supporting the terminal pin, and an insulator that insulates between the terminal pin and the plate, wherein at least a portion of the insulator is formed to be surrounded by the terminal pin, so that it is possible to suppress the increase in cost, weight, and size due to the connector.

DESCRIPTION OF DRAWINGS

FIG. 1 is a cross sectional view showing a conventional electric compressor;

FIG. 2 is a front view showing a connector and an inverter in the electric compressor of FIG. 1;

FIG. 3 is a cross sectional view taken along line I-I;

FIG. 4 is a perspective view showing a connector in the electric compressor according to an embodiment of the present disclosure;

FIG. 5 is a cross sectional view taken along line II-II of FIG. 4; and

FIG. 6 is a cross sectional view taken along line III-III of FIG. 4.

DESCRIPTION OF AN EMBODIMENT

Hereinafter, an electric compressor according to an embodiment of the present disclosure will be described in detail with reference to the accompanying drawings.

FIG. 4 is a perspective view showing a connector in the electric compressor according to the embodiment of the present disclosure. FIG. 5 is a cross sectional view taken along line II-II of FIG. 4. FIG. 6 is a cross sectional view taken along line III-III of FIG. 4.

Meanwhile, for convenience of description, reference is made to FIG. 1 for the description of components unshown in FIGS. 4 to 6.

Referring to the accompanying FIGS. 4 to 6 and FIG. 1, the electric compressor according to the embodiment of the present disclosure includes a housing 10, a compression mechanism 20 that is within the housing 10 and compresses a refrigerant, a motor 30 that provides power to the compression mechanism 20, an inverter 40 that controls the motor 30, and a connector 500 that electrically connects the motor 30 and the inverter 40.

The housing 10 includes a center housing 12 which is fastened to one side of the compression mechanism 20, a front housing 14 which is coupled to the center housing 12 and forms a motor receiving space S1 in which the motor 30 is received, an inverter housing 14 which is coupled to the front housing 14 on the opposite side to the center housing 12 with respect to the front housing 14 and forms an inverter receiving space S2 in which the inverter 40 is received, and a rear housing 18 which is coupled to the other side of the compression mechanism 20 and has a discharge chamber D receiving the refrigerant discharged from the compression mechanism 20.

Here, the front housing 14 includes a partition wall 14*a* that divides the motor receiving space S1 and the inverter receiving space S2. The partition wall 14*a* includes a through hole 14*b* that passes through the partition wall 14*a*. The connector 500 may be mounted in the through hole 14*b*.

In addition, the front housing 14 may further include an annular wall 14*c* that protrudes from an outer periphery of the partition 14*a* toward the center housing 12 side. The annular wall 14*c* may include a suction port (not shown) that pass through the annular wall 14*c* such that the refrigerant is guided to the motor receiving space S1.

The motor 30 may include a stator 32 supported on the annular wall 14*c* and a rotor 34 disposed within the stator 32 and rotated by the interaction with the stator 32.

The stator 32 includes a plurality of stacked iron cores formed in an approximately annular shape and a coil wound around the iron core. The coil may be electrically connected to the connector 500 through a motor terminal 36 coupled to an end of the coil.

The rotor 34 is formed in a substantially cylindrical shape and includes a permanent magnet. An outer peripheral surface of the rotor 34 faces an inner peripheral surface of the stator 32 with a predetermined gap. In addition, a rotary shaft 60 that transmits the rotational force of the rotor 34 to the compression mechanism 20 may be press-fitted into the center of the rotor 34.

The compression mechanism 20 may include a fixed scroll 22 that is fixedly installed thereon and an orbiting scroll 24 that is engaged with the fixed scroll 22, forms, together with the fixed scroll 22, a compression chamber, and performs an orbiting motion by the rotary shaft 60.

Here, in the embodiment, the compression mechanism 20 is formed in a so-called scroll type, and is not limited to this. The compression mechanism 20 may be formed in different types such as in a reciprocating type, in a vane rotary type, etc.

The inverter 40 may include a substrate 42, various devices 44 installed on the substrate 42, and an inverter terminal 46, and may be electrically connected to the connector 500 through the inverter terminal 46.

The connector 500 may include a plate 510, a plurality of terminal pins 520, and an insulator 530. The plate 510 supports the plurality of terminal pins 520 while sealing the motor receiving space S1 from the inverter receiving space S2 by covering the through hole 14*b* of the partition wall 14*a*. The plurality of terminal pins 520 is made of a conductive material each, passes through the plate 510, and is electrically connected to the motor terminal 36 and the inverter terminal 46. The insulator 530 that insulates between and the plurality of terminal pins 520 and the plate 510.

The plate 510 has a rectangular shape of which the width (a distance measured in a direction perpendicular to the height and length) is greater than the height (a distance measured in the extension direction of the terminal pins 520) and is less than the length (a distance measured in the arrangement direction of the plurality of terminal pins 520).

In addition, the plate 510 may include a plurality of holes 512 extending through the plate 510 in a height direction thereof. The plurality of holes 512 may be arranged in the longitudinal direction of the plate 510.

Here, a fixing member (not shown) for fixing the plate 510 is inserted into two holes 512*a* located at both ends in the longitudinal direction of the plate 510 among the plurality of holes 512. The plurality of terminal pins 520 and the insulator 530 may be inserted into the remaining holes 512*b* among the plurality of holes 512.

The plurality of terminal pins 520 may have a large current flow per unit area. The insulator 530 may be formed to secure insulation while absorbing thermal expansion of the plurality of terminal pins 520.

Specifically, the insulator 530 may include a first end 531 protruding toward the motor 30 side, a second end 532 protruding toward the inverter 40 side, and a middle portion 533 extending from the first end 531 to the second end 532 and passing through the plate 510.

The first end 531 and the second end 532 are each formed in a cylindrical shape. The middle portion 533 is formed in a cylindrical shape that is concentric with the first end 531 and the second end 532 and that has an outer diameter larger than those of the first end 531 and the second end 532, so that a first stepped portion 534 may be formed between the first end 531 and the middle portion 533, and a second stepped portion 535 may be formed between the second end 532 and the middle portion 533.

Here, the first end 531 may include a first front end 531*a* protruding further toward the motor 30 side than a first terminal 521 to be described later, and the second end 532 may include a second front end 532*a* protruding further toward the inverter 40 side than a second terminal 522 to be described later. Edges of the first front end 531*a* and the second front end 532*a* may be chamfered.

In the embodiment, the edges of the first front end 531*a* and the second front end 532*a* are chamfered round each, and thus, a first rounded surface 531*aa* and a second rounded surface 532*aa* are formed. However, they are not limited to this. Here, in order to reduce an insertion force of lamella spring to be described later, it may be preferable that the edges of the first front end 531*a* and the second front end 532*a* are chamfered round as in this embodiment.

In addition, in the embodiment, the first stepped portion 534 and the second stepped portion 535 are chamfered at an angle, but are not limited thereto.

Meanwhile, the insulator 530 may further include a first flange 536 and a second flange 537. The first flange 536 extends radially outward from the middle portion 533 and covers a portion of a motor-facing surface of the plate 510. The second flange 537 extends radially outward from the middle portion 533 and covers a portion of an inverter-facing surface of the plate 510.

The plurality of terminal pins 520 include the first terminal 521 that surrounds an outer peripheral surface of the first end 531, the second terminal 522 that surrounds an outer peripheral surface of the second end 532, and a connection portion 523 that extends from the first terminal 521 to the second terminal 522 and is received in the middle portion 533.

The first terminal 521 and the second terminal 522 may each be formed in an annular shape. Here, since the height of the first terminal 521 is less than the height of the first end 531, the first end 531 may include, as described above, the first front end 531*a* protruding further toward the motor 30 side than the first terminal 521. In addition, since the height of the second terminal 522 is less than the height of the second end 532, the second end 532 may include, as described above, the second front end 532*a* protruding further toward the inverter 40 side than the second terminal 522.

Also, the first terminal 521 and the second terminal 522 may be formed to be spaced apart from each other in the height direction of the plate 510 in order to obtain an insulation distance from the plate 510.

Here, so as to prevent insulation breakdown and to minimize size increase, it is preferable that the first terminal 521 and the second terminal 522 should be spaced apart from the plate 510 within a range of 3 mm to 20 mm. As in the present example, it may be more preferable that they should be spaced apart by 8.5 mm.

The connection portion 523 may include a central portion 524 disposed concentrically with the first terminal 521 and the second terminal 522, a first curved portion 525 extending from the central portion 524 to the first terminal 521, and a second curved portion 526 extending from the central portion 524 to the second terminal 522.

Here, as the first curved portion 525 and the second curved portion 526 are provided, the central portion 524 received within the middle portion 533 of the insulator 530 may be connected to the first terminal 521 that surrounds the outer peripheral surface of the first end 531 and the second terminal 522 that surrounds the outer peripheral surface of the second end 532 of the insulator 530.

Also, the connection portion 523 may be formed in a plate shape with a quadrangular cross-section in a direction perpendicular to the extension direction.

Here, the quadrangular cross-section includes a pair of long sides parallel to each other and a pair of short sides parallel to each other. The length of the long side may be formed less than the outer diameter of the first terminal 521 and the outer diameter of the second terminal 522. The length of the short side may be formed less than the length of the long side.

In addition, the connection portion 523 includes a pair of long side surfaces 523*a* each including the pair of long sides and a pair of short side surfaces 523*b* each including the pair of short sides. When the plurality of terminal pins 520 is arranged to be spaced apart from each other in the longitudinal direction of the plate 510, the long side surfaces 523*a* of the plurality of terminal pins 520 may be arranged to face each other.

In addition, the connection portion 523 may include a groove 523*c* that is engraved on the outer peripheral surface of the connection portion 523. The groove 523*c* may have, for example, a quadrangular, triangular, or semicircular shape. The insulator 530 may include a protrusion 533*a* that is inserted into the groove 523*c*.

Here, the insulator 530 is made of a plastic material, and the terminal pin 520 is made of a copper material. The connector 500 may be formed by that the insulator 530 is injected with the terminal pin 520 inserted into the hole 512*b* of the plate 510.

Hereinafter, an operation effect of the electric compressor according to the embodiment will be described.

That is, in the electric compressor of the embodiment, when power is applied to the motor 30, a low-temperature and low-pressure refrigerant flows into the motor receiving space S1 through the suction port (not shown). The refrigerant in the motor receiving space S1 may flow into the compression mechanism 20 and be compressed at high temperature and high pressure, and then be discharged to the outside of the housing 10 through the discharge chamber D.

In this process, the motor 30 is controlled by the inverter 40 electrically connected through the connector 500, so that cooling efficiency can be variably controlled.

Here, in the electric compressor according to the embodiment, since the insulator 530 is made of a plastic material, the increase in cost, weight, and size due to the connector 500 can be suppressed. Specifically, as the insulator 530 is made of a plastic material, the insulator 53 has a small specific gravity and is easy to process, resulting in the reduction in weight and cost. In addition, even though the terminal pin 520 is made of a material having a high electrical conductivity and has a large thermal expansion, the insulator 530 is made of a plastic material capable of absorbing thermal expansion of the terminal pin 520 and is not damaged. Therefore, the terminal pin 520 may be made of a copper material having a high electrical conductivity. Accordingly, there is no need to increase the outer diameter of the terminal pin 520 so as to meet a predetermined allowable current, making it easy to obtain an insulation distance and reducing the size and cost of the connector 500.

Also, as the terminal pin 520 is made of a copper material, even though the first terminal 521 and the second terminal 522 are formed in a thin ring shape and the connection portion 523 is formed in a thin plate shape, a predetermined allowable current can be met. Here, as the terminal pin 520 is formed thin as a whole, the cost and weight of the terminal pin 520 can be reduced.

Also, the connection portion 523 is formed in a plate shape having the pair of long side surfaces 523*a* and the pair of short side surfaces 523*b*, and the long side surfaces 523*a* of the plurality of terminal pins 520 are arranged to face each other. Accordingly, it can be easy to obtain the insulation distance between the connection portions 523 of the plurality of terminal pins 520. Also, the connection portion 523 includes the central portion 524 that is disposed concentrically with the first terminal 521 and the second terminal 522, thereby making it easier to obtain the insulation distance between the connection portions 523 of the plurality of terminal pins 520. Also, as the connection portion 523 is received within the insulator 530 (more precisely, the middle portion 533), insulation can be secured between not only between the connection portions 523 of the plurality of terminal pins 520 but also between the plurality of terminal pins 520 and the plate 510. Also, the securing of the insulation of the plurality of terminal pins 520 may lead to reduction in the size of the connector 500.

Also, as the first end 531 and the second end 532 are each formed in a cylindrical shape and the first terminal 521 and the second terminal 522 are formed in an annular shape surrounding the first end 531 and the second end 532, respectively, a conventional lamella spring can be used. That is, the first terminal 521 is inserted into a first lamella spring (not shown) and the outer peripheral surface of the first terminal 521 comes into contact with the inner peripheral surface of the first lamella spring (not shown). Also, the first lamella spring (not shown) is inserted into the motor terminal 36 and the outer peripheral surface of the first lamella spring (not shown) comes into contact with the motor terminal 36. As a result, the terminal pin 520 may be electrically connected to the motor 30. Accordingly, poor contact that occurs when the inner diameter of the motor terminal 36 is larger than the outer diameter of the first terminal 521 can be prevented. Also, the second terminal 522 is inserted into a second lamella spring L2 and the outer peripheral surface of the second terminal 522 comes into contact with the inner peripheral surface of the second lamella spring L2. Also, the second lamella spring L2 is inserted into the inverter terminal 46 and the outer peripheral surface of the second lamella spring L2 comes into contact with the inverter terminal 46. As a result, the terminal pin 520 may be electrically connected to the inverter 40. Accordingly, poor contact that occurs when the inner diameter of the inverter terminal 46 is larger than the outer diameter of the second terminal 522 can be prevented.

Also, as the first end 531 includes the first front end 531*a*, the first end 531 and the first terminal 521 can be easily inserted into the first lamella spring (not shown). That is, there may be a burr at the edge of the first terminal 521, and this burr may interfere with the insertion of the first end 531 and the first terminal 521 into the first lamella spring (not shown). However, as in the embodiment, as the first end 531 includes the first front end 531*a* protruding further than the first terminal 521, the first front end 531*a* may guide the first end 531 and the first terminal 521 to be inserted into the first lamella spring (not shown).

Also, as the edge of the first front end 531*a* is chamfered, the first end 531 and the first terminal 521 can be more easily inserted into the first lamella spring (not shown). That is, the first rounded surface 531*aa* of the first front end 531*a* may guide the first end 531 and the first terminal 521 to be inserted into the first lamella spring (not shown).

Also, as the first stepped portion 534 is formed between the first end 531 and the middle portion 533, the first lamella spring (not shown) is caught by the first stepped portion 534. This can prevent the first end 531 and the first terminal 521 from being inserted further into the first lamella spring (not shown) than a predetermined position.

Likewise, as the second end 532 includes the second front end 532*a*, the second end 532 and the second terminal 522 can be easily inserted into the second lamella spring L2.

Also, as the edge of the second front end 532*a* is chamfered, the second end 532 and the second terminal 522 can be more easily inserted into the second lamella spring L2.

Also, as the second stepped portion 535 is formed between the second end 532 and the middle portion 533, the second lamella spring L2 is caught by the second stepped portion 535. This can prevent the second end 532 and the second terminal 522 from being inserted further into the second lamella spring L2 than a predetermined position.

Also, as the connection portion 523 includes the groove 523*c* and the insulator 530 includes the protrusion 533*a* inserted into the groove 523*c*, the separation between the insulator 530 and the terminal pin 520 can be suppressed.

Also, as the insulator 530 includes the first flange 536, the separation of the insulator 530 from the plate 510 to the inverter 40 side can be prevented.

Also, as the insulator 530 includes the second flange 537, the separation of the insulator 530 from the plate 510 to the motor 30 side can be prevented.

Also, the first flange 536 and the second flange 537 can prevent that the motor receiving space S1 and the inverter receiving space S2 communicate with each other through between the insulator 530 and the plate 510.

The invention claimed is:

1. An electric compressor comprising:

a motor configured to generate power;

a compression mechanism configured to be driven by the motor and to compress a refrigerant;

an inverter configured to control the motor; and a connector configured to include a terminal pin connecting the motor and the inverter, a plate supporting the terminal pin, and an insulator that insulates between the terminal pin and the plate, wherein at least a portion of the insulator is formed to be surrounded by the terminal pin, wherein the insulator further comprises: a first end protruding toward the motor, a second end protruding toward the inverter, and a middle portion extending from the first end to the second end and passing through the plate, and wherein the terminal pin further comprises: a first terminal that surrounds an outer peripheral surface of the first end, a second terminal that surrounds an outer peripheral surface of the second end, and a connection portion that extends from the first terminal to the second terminal and is received in the middle portion.

2. The electric compressor of claim 1, wherein the terminal pin further comprises portions having different cross-sectional areas in a direction perpendicular to an extension direction.

3. The electric compressor of claim 1, wherein the connection portion further comprises a groove that is engraved on an outer peripheral surface of the connection portion, and wherein the insulator further comprises a protrusion that is inserted into the groove.

4. The electric compressor of claim 1, wherein the first end and the second end are each formed in a cylindrical shape, and wherein the first terminal and the second terminal are each formed in an annular shape.

5. The electric compressor of claim 4, wherein the first terminal is inserted into a first lamella spring and an outer peripheral surface of the first terminal comes into contact with an inner peripheral surface of the first lamella spring, and the first lamella spring is inserted into a terminal of the motor and an outer peripheral surface of the first lamella spring comes into contact with the terminal of the motor, so that the terminal pin is electrically connected to the motor, and wherein the second terminal is inserted into a second lamella spring and an outer peripheral surface of the second terminal comes into contact with an inner peripheral surface of the second lamella spring, and the second lamella spring is inserted into a terminal of the inverter and an outer peripheral surface of the second lamella spring comes into contact with the terminal of the inverter, so that the terminal pin is electrically connected to the inverter.

6. The electric compressor of claim 4, wherein the first end further comprises a first front end protruding further toward the motor than the first terminal, and wherein the second end further comprises a second front end protruding further toward the inverter than the second terminal.

7. The electric compressor of claim 6, wherein an edge of the first front end and an edge of the second front end are chamfered.

8. The electric compressor of claim 4, wherein the middle portion is formed in a cylindrical shape that is concentric with the first end and the second end and that has an outer diameter larger than those of the first end and the second end, so that a first stepped portion is formed between the first end and the middle portion and a second stepped portion is formed between the second end and the middle portion.

9. The electric compressor of claim 1, wherein a cross-section perpendicular to an extension direction of the connection portion further comprises a pair of long sides parallel to each other and a pair of short sides parallel to each other, and wherein a length of the long side is formed less than an outer diameter of the first terminal and an outer diameter of the second terminal, and a length of the short side is formed less than the length of the long side.

10. The electric compressor of claim 9, wherein the connection portion further comprises a pair of long side surfaces each including the pair of long sides and a pair of short side surfaces each including the pair of short sides, wherein a plurality of the terminal pins is provided, and wherein the plurality of terminal pins is arranged to be spaced apart from each other in an extension direction of the plate, and the long side surfaces of the plurality of terminal pins are arranged to face each other.

11. The electric compressor of claim 1, wherein the connection portion further comprises a central portion disposed concentrically with the first terminal and the second terminal, a first curved portion extending from the central portion to the first terminal, and a second curved portion extending from the central portion to the second terminal.

12. The electric compressor of claim 1, wherein the first terminal and the second terminal are each formed to be spaced apart from the plate within a range of 3 mm to 20 mm.

13. The electric compressor of claim 1, wherein the insulator further comprises a first flange and a second flange, and wherein the first flange extends radially outward from the middle portion and covers a portion of a motor-facing surface of the plate, and the second flange extends radially outward from the middle portion and covers a portion of an inverter-facing surface of the plate.

14. The electric compressor of claim 1, wherein the insulator is made of a plastic material, and the terminal pin is made of a copper material.

* * * * *